United States Patent [19]

Ueda et al.

[11] Patent Number: 5,698,614
[45] Date of Patent: Dec. 16, 1997

[54] FLUORESCENT INK COMPOSITION FOR USE IN MARKING PENS

[75] Inventors: Hiroaki Ueda; Masakazu Yokoi; Yasushi Okuda, all of Higashinari-ku, Japan

[73] Assignee: Sakura Color Products Corporation, Osaka, Japan

[21] Appl. No.: 478,598

[22] Filed: Jun. 7, 1995

[30] Foreign Application Priority Data

Jun. 9, 1994 [JP] Japan .................................. 6-127553

[51] Int. Cl.$^6$ ...................................................... C09D 11/18
[52] U.S. Cl. ................ 523/161; 524/356; 260/DIG. 38; 106/31.13; 106/31.15; 106/31.27; 106/31.01; 252/301.35
[58] Field of Search ................. 523/161; 260/DIG. 38; 106/22 R, 19 R, 20 R; 524/356; 252/301.35

[56] References Cited

U.S. PATENT DOCUMENTS

| | | | |
|---|---|---|---|
| 4,150,997 | 4/1979 | Hayes | 106/15.05 |
| 4,242,139 | 12/1980 | Tröster | 106/22 B |
| 5,135,569 | 8/1992 | Mathias | 106/22 |
| 5,156,675 | 10/1992 | Breton et al. | 106/22 |
| 5,256,192 | 10/1993 | Liu et al. | 106/21 A |

FOREIGN PATENT DOCUMENTS

| | | |
|---|---|---|
| 55-23145 | 2/1980 | Japan . |
| 62-129369 | 6/1987 | Japan . |
| 4-139273 | 5/1992 | Japan . |
| 5-148443 | 6/1993 | Japan . |

*Primary Examiner*—Vasu Jagannathan
*Assistant Examiner*—John J. Guarriello
*Attorney, Agent, or Firm*—Wenderoth, Lind & Ponack

[57] ABSTRACT

A fluorescent ink composition which comprises:

(a) an organic solvent which comprises propylene glycol monomethyl ether as a solvent:

(b) a solution type fluorescent pigment dissolved in the organic solvent; and (c) a ketone resin.

5 Claims, No Drawings

_5,698,614_

FLUORESCENT INK COMPOSITION FOR USE IN MARKING PENS

FIELD OF THE INVENTION

This invention relates to a fluorescent ink composition for use in marking pen, more particularly to an oil base fluorescent ink composition which is substantially nontoxic, clear in color, of high fluorescent strength and of good storability. The invention further relates to a marking pen which contains the above mentioned oil base fluorescent ink composition.

BACKGROUND OF THE INVENTION

The conventional ink composition for use in a marking pen contains an organic solvent such as methyl cellosolve or ethyl cellosolve. These organic solvents are relatively low in toxicity, however, they might be still injurious to the health. On the other hand, a variety of fluorescent ink compositions are already known. A fluorescent ink composition which employs a fluorescent dye as a fluorescent colorant dissolved in a solvent is suitable for use in a marking pen, but it is not clear in color. On the other hand, a fluorescent ink composition which employs a dispersion type fluorescent pigment as a fluorescent colorant provides writings which are blurred or uneven in fluorescent strength On account of sedimentation of the pigment in the ink composition. The ink composition has naturally bad storability and is far from suitable for use in a marking pen.

Thus there has been demanded an oil base fluorescent ink composition which is substantially nontoxic and suitable for use in a marking pen.

SUMMARY OF THE INVENTION

It is an object of the invention to provide an oil base fluorescent ink composition which is substantially nontoxic, clear in color and of high fluorescent strength and excellent in storability, and in addition, suitable for use in a marking pen.

It is a further object of the invention to provide a marking pen which contains such an oil base fluorescent ink composition.

The invention provides an oil base fluorescent ink composition which comprises:

(a) an organic solvent which comprises propylene glycol monomethyl ether;

(b) a solution type fluorescent pigment dissolved in the organic solvent; and (c) a ketone resin.

The ink composition of the invention is particularly suitable for use in a writing instrument called a marking pen which has an ink reservoir composed of a porous body such as felt or a bundle of fibers, impregnated with an ink composition within a hollow holder and a porous pen tip composed of a porous material such as felt, fiber or resin to which the ink composition is supplied from the reservoir by making use of capillary phenomenon, thereby permitting to write.

Thus, the invention further provides a marking pen for writing which comprises an ink reservoir composed of a porous body which is impregnated with such an oil ink composition as above mentioned. The ink composition is homogeneous so that it does not clog the reservoir or the pen tip, and the marking pen writes well over a long period of time.

DESCRIPTION OF PREFERRED EMBODIMENTS

The ink composition contains an organic solvent which is mainly composed of propylene glycol monomethyl ether, and it is preferred that the solvent is composed of 80–100% by weight of propylene glycol monomethyl ether and, optionally together with 20–0% by weight of at least one member selected from the group consisting of a lower aliphatic alcohol of 1 to 3 carbons and dipropylene glycol monomethyl ether. The lower aliphatic alcohol includes, for example, methanol, ethanol, n-propanol, i-propanol, or a mixture of two or more of these. According to the invention the use of such a solvent as above mentioned permits complete dissolution of the fluorescent pigment used in the solvent, so that the resultant ink composition is substantially nontoxic and forms writings with desired darkness.

The ink composition contains the solvent usually in an amount of 45–95% by weight, preferably 65–90% by weight, although not limited thereto. The use of solvent in excess results in writings short of darkness, whereas the use of solvent in amounts too small the resultant ink composition has too high a viscosity and writes bad.

The ink composition contains a solution type fluorescent pigment. In general, the fluorescent pigment is called an organic fluorescent pigment or a daylight fluorescent pigment, and as well known, it is such a pigment that has fluorescent or brilliant color when it receives daylight or the like. The fluorescent pigment is usually available as a powder composed of a transparent synthetic resin matrix having a fluorescent dye dissolved therein together with a ultraviolet rays absorbent. The synthetic resin serves as a matrix or carrier material for the fluorescent dye to form a solid solution ("Coloring Material", Vol. 58[2],pp. 73–79 (1985)). The fluorescent pigment as above mentioned is called a synthetic resin solid solution type fluorescent pigment. Norm specifically, this type of fluorescent pigment is produced, for example, by dissolving a fluorescent dye together with a ultraviolet rays absorbent in a transparent synthetic resin and then the resultant mass of colored resin is crushed and powdered. A fluorescent dye and a ultraviolet rays absorbent may be dissolved when the resin is produced. The synthetic resin solid solution type fluorescent pigment may also be produced by making use of emulsion polymerization when a resin is produced.

The synthetic resin solid solution type fluorescent pigment is divided into a solution type and a dispersion type. The dispersion type fluorescent pigment is usually a powder insoluble in an organic solvent so that it is dispersed in an organic solvent when it is used. In turn, the solution type fluorescent pigment is usually soluble in an organic solvent so that it is dissolved in an organic solvent when it is used. When a resin insoluble in a common organic solvent is used as a matrix of the pigment, the resultant fluorescent pigment is the dispersion type. When a resin soluble in a common organic solvent is used as a matrix of the pigment, the resultant fluorescent pigment is the solution type.

The invention uses the solution type fluorescent pigment, and hence the ink composition of the invention is a homogeneous solution. However, the solution type fluorescent pigment used in the invention is not limited in the method by which it is produced.

The solution type fluorescent pigment used in the invention is commercially available, among which are, for example, MPI series of Nippon Keiko Kagaku K.K. such as MPI-501, 502, 503, 504, 505, 506, 507, 508, 501C, 503C, 504C, 505C, 506C, 507C or 508C: FM-10 and FM-100 series of Sinloich Co., Ltd. such as FM-11, 12, 13, 14, 15, 16, 17, 18, 25, 27, 103, 104, 105, 106, 107 or 108; Flare 410 series of Sterling Industrial Colours Ltd. such as 41031 Yellow, 41035 Rose, 41037 Magenta, 41022 Brightener or 41022N Brightener. The solution type fluorescent pigment may be used singly or as a mixture.

The ink composition of the invention contains the solution type fluorescent pigment in an amount of 0.5–30%, preferably 5–20% by weight, based on the ink composition. When the pigment is used in excess, the resultant ink composition has too a high viscosity, and bedsides a marking pen containing the ink composition is clogged at its reservoir or pen tip and writes bad, whereas when the pigment is used in too small an amount, the resultant ink composition writes with insufficient darkness.

The ink composition of the invention may contain a fluorescent dye or a common oil soluble dye to arrange or control the fluorescent color or strength of the resultant ink composition.

The ink composition of the invention further contains a ketone resin so that the resultant ink composition has improved storability, leveling effect and water resistance as well as it has good adhesion to a writing surface. The ketone resin is a resin which is obtained by condensation of alphatic or aromatic ketones with aldehydes, usually formaldehyde. It is particularly preferred that the ketone resin used is has a viscosity of 2.7–3.5, preferably 2.8–3.4 centipoises at 20° C. as measured with a 10% by weight of solution of the resin in propylene glycol monomethyl ether with an EL viscosimeter.

The ketone resin such as above mentioned is also commercially available, for example, as Halon 80 (having a viscosity of 2.87 centipoises at 20° as measured with a 10% by weight of solution of the resin in propylene glycol monomethyl ether with an EL viscosime; the same hereafter) or Halon 110H (having a viscosity of 3.29 centipoises) available from Honshu Kagaku Kogyo K.K.; Hilac 110H (having a viscosity of 3.34 centipoises) available from Hitachi Kaset Kogyo K.K.: Ketone resin 90 (having a viscosity of 2.99 centipoises) available from Arakawa Kagaku Kogyo The use of other resins than the ketone resin as a resin component often makes the resultant ink composition less storable or causes change in color as times passes, although the reason therefor has not yet been clarified, and accordingly other resins than the ketone resin is not suitable for use as the sole resin component in the ink composition. However, other resins other than the ketone resin may be used in a small amount if such problems as above are not accompanied.

The ink composition of the invention contains the ketone resin in an amount of 1–20%, preferably 2–15%, by weight, based on the ink composition. When the amount of the ketone resin is more than 20% by weight, the resultant ink composition is so viscous that it writes bad, whereas when the amount of the ketone resin is less than 1% by weight, the resultant ink composition has poor adhesion to a writing surface and besides the ink composition is short of water resitance.

Other additives may be contained in the ink composition, if necessary. For instance, a leveling agent may be incorporated into the ink composition so that it is not repelled or it may be even in darkness when writing on an impervious writing surface. As such a leveling agent, there may be preferably used an organic silicone resin such as BYK-300, 310 or 302 available from BYK-Chemie Japan K.K. or ethyl cellulose such as Ethocel available from Dow Chemical Nippon K.K. The leveling agent may be contained in an amount of up to 2% by weight based on the ink composition.

Although the process for the production of the ink composition of the invention is not limited specifically, however, it is usually produced by dissolving the ketone resin in the solvent under heating and then a fluorescent pigment and other additives are added to the resultant solution followed by stirring to provide a homogeneous ink composition.

As above set forth, since the fluorescent ink composition of the invention contains a solution type fluorescent pigment as a fluorescent pigment, a ketone resin as a resin component, and propylene glycol monomethyl ether in an amount of at least 80% by weight of the solvent, each specifically, and hence the fluorescent ink composition of the invention is substantially nontoxic and has clear and high strength fluorescent colors as well as improved storability. The ink composition contains no pigment particles, but it is homogeneous, and thus it is particularly suitable for use in a marking pen for writing as hereinbefore mentioned.

The invention will be set forth in detail with reference to examples, however, the invention is not limited thereto. In the examples, parts are by weight.

| FORMULATIONS OF INK COMPOSITIONS | |
|---|---|
| Example 1 | |
| Fluorescent pigment (MPI-505C) | 15.0 parts |
| Ketone resin (Halon 80) | 5.0 parts |
| Leveling agent (BYK-300) | 0.1 parts |
| Propylene glycol monomethyl ether | 74.6 parts |
| Dipropylene glycol monomethyl ether | 5.0 parts |
| Example 2 | |
| Fluorescent pigment (MPI-507) | 12.0 parts |
| Ketone resin (Ketone resin K-90) | 8.0 parts |
| Propylene glycol monomethyl ether | 80.0 parts |
| Example 3 | |
| Fluorescent pigment (FM-104) | 18.0 parts |
| Ketone resin (Hilac 110H) | 3.0 parts |
| Leveling agent (Ethocel 10) | 0.1 parts |
| Propylene glycol monomethyl ether | 73.4 parts |
| Dipropylene glycol monomethyl ether | 5.5 parts |
| Example 4 | |
| Fluorescent pigment (41031 Yellow) | 10.0 parts |
| Fluorescent pigment (41037 Magenta) | 1.5 parts |
| Ketone resin (Hilac 110H) | 5.5 parts |
| Leveling agent (Ethocel 10) | 0.1 parts |
| Propylene glycol monomethyl ether | 75.5 parts |
| Ethanol | 2.9 parts |
| Example 5 | |
| Fluorescent pigment (MPI-505C) | 13.5 parts |
| Fluorescent pigment (41022 Brightener) | 3.0 parts |
| Non-fluorescent oil soluble pigment (Neozapon Blue 807) | 0.5 parts |
| Ketone resin (Halon 80) | 4.5 parts |
| Propylene glycol monomethyl ether | 78.5 parts |
| Reference Example 1 | |
| Fluorescent pigment (FZ-3147, Dispersion type) | 10.0 parts |
| Ketone resin (Halon 80) | 9.0 parts |
| Propylene glycol monomethyl ether | 76.0 parts |
| Dipropylene glycol monomethyl ether | 5.0 parts |
| Reference Example 2 | |
| Fluorescent dye (Brilliant Flavin E-10G (300%)) | 17.5 parts |
| Ketone resin (Hilac 110H) | 5.5 parts |
| Leveling agent (Ethocel 10) | 0.1 parts |
| Propylene glycol monomethyl ether | 71.9 parts |
| Ethanol | 5.0 parts |

-continued

FORMULATIONS OF INK COMPOSITIONS

Reference Example 3

| | |
|---|---|
| Fluorescent pigment (FM-104) | 10.0 parts |
| Alkylphenol resin (Tamanol 510, available from Arakawa Kagaku Kogyo K.K.) | 4.5 parts |
| Propylene glycol monomethyl ether | 80.0 parts |
| Dipropylene glycol monomethyl ether | 5.5 parts |

TESTING OF ABOVE PREPARED INK COMPOSITIONS

The ink composition was charged in Sakura Marker 367, a marking pen for writing which has an ink reservoir composed of a porous body and a porous pen tip as mentioned hereinbefore available from Sakura Color Products Corp. and the fluorescent color strength, storability and changeability in color were measured. The results are shown in Table 1.

TABLE 1

| Ink Compositions | Fluorescent Color Strength | Storability | Changeability in Color |
|---|---|---|---|
| Example 1 | A | A | A |
| Example 2 | A | A | A |
| Example 3 | A | A | A |
| Example 4 | A | A | A |
| Example 5 | A | A | A |
| Reference | | | |
| Example 1 | A | C | A |
| Example 2 | B | A | A–B |
| Example 3 | C | A | C |

The fluorescent color strength was measured by handwriting on paper according to JIS P 3201 and the resultant writing was examined if it had clear and strong fluorescent color. A: clear and strong in fluorescent color; B: weak in fluorescent color: C: no fluorescent color.

The storability was measured by handwriting on paper according to JIS P 3201 after standing the marking pen at 50° C. for one month and the resultant writing was examined if the writing was sufficient and even in darkness sufficient and even in darkness; C: faint and uneven in darkness.

The changeability in color was measured by handwriting on paper according to JIS P 3201 and the color of the resultant writing was compared with the color of a solution of the fluorescent pigment or dye. A: substantially the same as the solution; C: dull.

As seen from the table, the ink composition of the invention has clear fluorescent color of high strength, improved storability and suffers from no change in color when writing. In contrast, the ink composition of reference Example 1 uses a dispersion type fluorescent pigment so that it is particularly poor in storability, while the ink composition of Reference Example 2 uses a fluorescent dye so that the resultant writing suffers from color in change as well as it is weak in fluorescent color strength. The ink composition of Reference Example 3 uses an alkylphenol resin in place of ketone resin as the sole resin component and thus it provides no fluorescent writings, and moreover the writing changes remarkably in color.

What is claimed is:

1. A fluorescent ink composition for use in marking pens, which comprises:

(a) an organic solvent which consists essentially of propylene glycol monomethyl ether in an amount of 80–100% by weight and at least one member selected from the group consisting of methanol, ethanol, n-propanol, isopropanol and dipropylene glycol monomethyl ether in an amount of 20–0% by weight;

(b) fluorescent pigment in an amount of 0.5–30% by weight based on the ink composition, wherein the fluorescent pigment is composed of a transparent synthetic resin matrix having a fluorescent dye dissolved therein and said pigment is dissolved in the organic solvent; and (c) a ketone resin which has a viscosity of 2.7–3.5 centipoises at 20° C. as measured with a 10% by weight of solution of the ketone resin in propylene glycol monomethyl ether with an EL viscosimeter in an amount of 1–20% by weight based on the ink composition.

2. The fluorescent ink composition as claimed in claim 1 wherein the fluorescent pigment is contained in an amount of 5–20% by weight based on the ink composition.

3. The fluorescent ink composition as claimed in claim 1 wherein the organic solvent is contained in an amount of 45–95% by weight based on the ink composition.

4. The fluorescent ink composition as claimed in claim 1 wherein the ketone resin is contained in an amount of 2–15% by weight based on the ink composition.

5. The fluorescent ink composition as claimed in claim 1 which further comprises a levelling agent selected from an organic silicone resin and an ethyl cellulose resin in an amount of up to 2% by weight based on the ink composition.

* * * * *